United States Patent
McKay et al.

(10) Patent No.: US 7,467,611 B2
(45) Date of Patent: Dec. 23, 2008

(54) RATE LIMITING AND BALANCING CONTROL SYSTEM FOR DUAL INDEPENDENT CAMSHAFT PHASING

(75) Inventors: Daniel L. McKay, Brighton, MI (US); James P. Waters, Waterford, MI (US)

(73) Assignee: Delphi Technologies, Inc., Troy, MI (US)

( * ) Notice: Subject to any disclaimer, the term of this patent is extended or adjusted under 35 U.S.C. 154(b) by 85 days.

(21) Appl. No.: 11/725,768

(22) Filed: Mar. 20, 2007

(65) Prior Publication Data

US 2008/0230022 A1    Sep. 25, 2008

(51) Int. Cl.
*F01L 1/34* (2006.01)
(52) U.S. Cl. .................. 123/90.17; 123/90.15; 464/160
(58) Field of Classification Search .............. 123/90.15, 123/90.16, 90.17, 90.18; 464/1, 2, 160
See application file for complete search history.

(56) References Cited

U.S. PATENT DOCUMENTS 6,488,008 B1    12/2002    Jankovic et al.
6,758,179 B1    7/2004    McKay et al.
6,877,466 B2 *    4/2005    Shindou et al. .......... 123/90.16

* cited by examiner

*Primary Examiner*—Ching Chang
(74) *Attorney, Agent, or Firm*—Paul L. Marshall (57) ABSTRACT

A method for controlling dual independent camshaft phasers in an internal combustion engine. The method has three basic steps: a) first, determining if rate balancing between the two phasers is required; b) second, determining the optimal rate balancing commands; and c) third, applying the determined rate balancing commands to the appropriate phaser(s). In determining the rate balancing commands, there are three possible phaser options: the intake phaser requires priority; the exhaust phaser requires priority; or neither phaser requires priority. Lookup tables are stored in the engine controller for each option. When either phaser has priority, the other phaser is actuated after a delay based upon the position error of the priority phaser, generally at a lower phase rate. When neither phaser has priority, both phasers are actuated at a rate consistent with oil-delivery capabilities of the engine.

18 Claims, 10 Drawing Sheets

RATE LIMITING AND BALANCING CONTROL SYSTEM FOR DUAL INDEPENDENT CAMSHAFT PHASING

TECHNICAL FIELD

The present invention relates to camshaft phasers for internal combustion engines; more particularly, to methods for controlling the actions of dual camshaft phasers for intake and exhaust valves; and most particularly, to a system for controlling dual independent camshaft phasers to provide simultaneous ratiometric scheduling of the phasers' movements relative to each other.

BACKGROUND OF THE INVENTION

Camshaft phasers for varying the valve timing of internal combustion engines are well known. A phaser typically comprises a rotor element attached to the end of a camshaft and variably displaceable rotationally within a stator element driven by the engine crankshaft. Phasers typically are actuated by a pressure duty cycle of oil derived from the engine's main oil supply and selectively directed to chambers within the phaser to alter the phase relationship between the rotor and the stator, and hence between the camshaft and the crankshaft.

Modern engines commonly are provided with a phaser on the intake valve camshaft; however, it is known that still greater engine control and efficiency can be obtained by providing an additional independent phaser on the exhaust valve camshaft in an engine having separate camshafts for separately actuating the intake valves and the exhaust valves. V-style engines may have two intake and two exhaust camshafts, for a total of four phasers.

A problem in operating an engine equipped with dual independent camshaft phasers (DICP) is how to coordinate their operation. In the prior art, control methods cannot deal with both phasers simultaneously, but rather with first one phaser and then the other, in rapid alternating succession or with both moving simultaneously, resulting in limited coordination of the two phasers.

Further, large demands are placed on the oiling system of the engine during transient conditions wherein the two (or more) phasers must be actuated during the same time period. Providing oiling system capacity to insure acceptable simultaneous actuation performance at full phasing rate adds cost to the engine, reduces fuel economy, and may result in aeration of the oil by drawing air from the engine crankcase. Additionally, fast step changes in phase position can result in combustion and air/fuel control issues due to inconsistent movement of the cam phasers with respect to time and to each other. Prior art hydraulically actuated cam phaser systems are susceptible to part-to-part, engine-to-engine, and even event-to-event variation that can be detrimental to combustion, air/fuel ratio control, driveability, emissions, and vehicle performance.

What is needed in the art is a system for controlling dual independent camshaft phasers (intake and exhaust) to provide simultaneous ratiometric scheduling of the phasers' movements relative to each other.

It is a principal object of the invention to provide controlled, consistent, synchronous movement of dual independent camshaft phasers, each operating at a rate within the constraints of the engine oiling system, to maintain combustion stability.

SUMMARY OF THE INVENTION

Briefly described, a control system in accordance with the invention is an extension of the single-phaser control system disclosed in U.S. Pat. No. 6,758,179 B1, the relevant disclosure of which is incorporated herein by reference. The present control system provides capability for simultaneous ratiometric scheduling of movements of dual intake and exhaust phasers relative to each other, providing smooth and consistent transitions between operating points while allowing for prioritized application of the available fluid power of the engine's oiling system. By rate-limiting the intake and exhaust phasers to different absolute rates, or as a function of the opposite phaser's control error (i.e., intake phaser rate limit is a function of the exhaust phaser position error), staging and smooth transitions can be achieved without undue computational overhead. By prioritizing rate limiting, or rate balancing of the operation of the intake and exhaust phasers or sets of phasers, lower demands are placed on the oiling system of the engine and therefore a smaller capacity oil pump may be used. Fuel economy, packaging, and cost benefits can be realized. Further, it can be advantageous for combustion and air/fuel ratio control to smoothly schedule the operation of intake and exhaust phasers. This rate balancing approach also permits the precise and repeatable operation of the cam phasers in a manner more consistent with the response characteristics of the air, fuel, and spark delivery systems of the overall engine management system, especially in areas of operation where there is surplus fluid power from the base engine oiling system which results in a cam phaser response that is too fast for the air, fuel, and spark delivery systems. Rate limiting also inherently removes bank-to-bank and car-to-car variability, as disclosed in the above-referenced patent. The system robustness enforced by the present invention upon the variation in performance characteristics of the individual elements of the cam phasing system permits relaxation of performance and/or dimensional tolerances that might otherwise drive increased piece costs and price, higher internal friction, higher reject rates in manufacturing, and/or increased rates of failure in the field in the absence of the present invention.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1A:
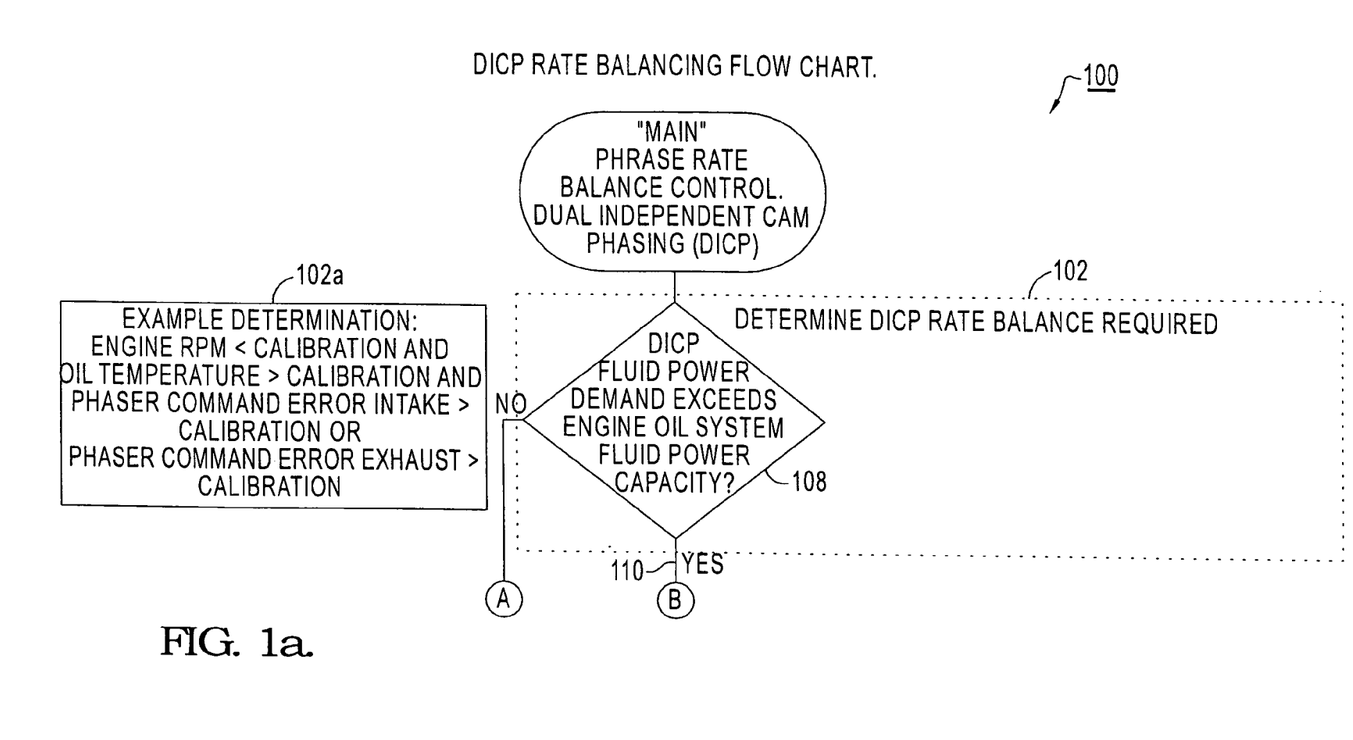
FIGS. 1a-1b provide a DICP Rate Balancing Flowchart in accordance with the invention, showing the process of the invention under three scenarios.

Referring now to the drawings, wherein the showings are for the purpose of illustrating an embodiment of the invention only and not for the purpose of limiting the same, FIG. 1a shows an internal combustion engine 5, controller 10, and variable cam phasing system for a dual cam engine which has been constructed in accordance with the prior art.

Engine 5 has an intake camshaft 17a that rotates around an axis and is operable to open and close each intake valve 12a corresponding to each cylinder 16 of the engine 5. The intake camshaft 17a opens each intake valve 12a relative to a top-dead center point of a piston 14 in the corresponding cylinder 16. The opening of each intake valve 12a is measured in units of degrees of camshaft rotation before the top-dead center point, and is also correlated to a position of a crankshaft 20 that is operably attached to each piston 14.

Engine 5 further has an exhaust camshaft 17b that rotates around an axis and is operable to open and close each exhaust valve 12b corresponding to each cylinder 16 of the engine 5. The exhaust camshaft 17b opens each exhaust valve 12b relative to a top-dead center point of a piston 14 in the corresponding cylinder 16. The opening of each exhaust valve 12b is measured in units of degrees of camshaft rotation before the top-dead center point, and is also correlated to a position of a crankshaft 20 that is operably attached to each piston 14.

The variable cam phasing system controls the rotation of the intake camshaft 17a and of the exhaust camshaft 17b, and hence the opening and corresponding closing of each intake valve 12a and each exhaust valve 12b relative to the top-dead center point of each piston in each corresponding cylinder. The engine 5 with pistons 14, camshafts 17, crankshaft 20, and the controller 10 are well known to one skilled in the art.

Figure 2:
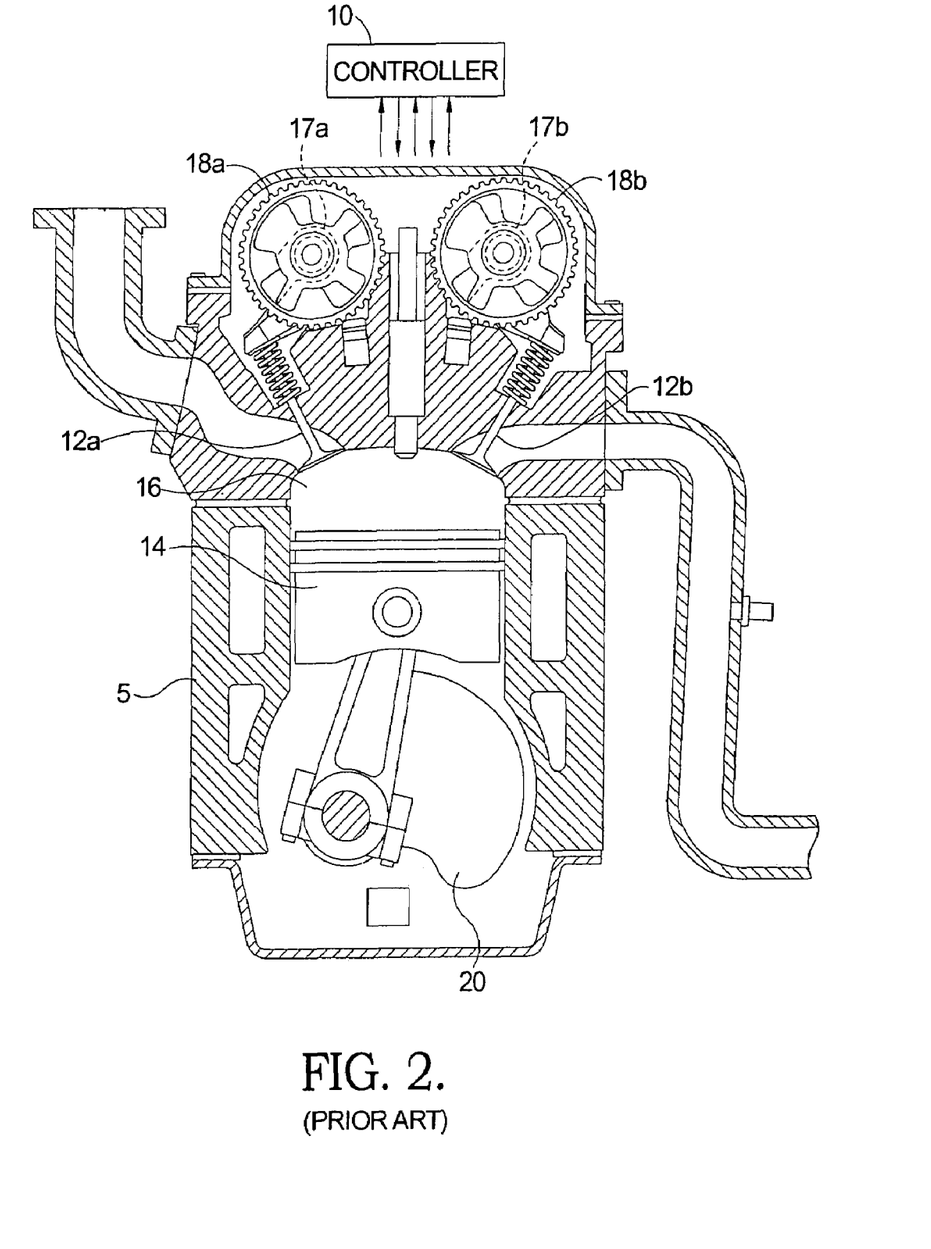
FIG. 2 is an elevational cross-sectional view of a prior art internal combustion engine equipped with dual independent camshaft phasers on the intake and exhaust camshafts, respectively.

A prior art engine 5 shown in FIG. 2 is suitable for use with the invention. Engine 5 comprises a single bank of in-line cylinders, an intake camshaft operable to open and close each of the intake valves, and an exhaust camshaft operable to open and close each of the exhaust valves. In a first engine embodiment as shown in FIG. 2, the variable cam phasing system preferably comprises a first vane-type variable cam phaser 18a operably attached to the intake camshaft 17a and fluidly connected to a first oil control valve (not shown), and a second vane-type variable cam phaser 18b operably attached to the exhaust camshaft 17b and fluidly connected to a second oil control valve (not shown). The oil control valves control the flow of pressurized engine oil independently to the intake cam phaser 18a and exhaust cam phaser 18b, respectively. A cam position sensor (not shown) for each phaser 18a, 18b is operable to measure degrees of camshaft rotation and is signally electrically connected to the controller 10. The controller 10 is operably connected to the first and second oil control valves (not shown) and controls the flow of pressurized engine oil to the vane-type variable cam phasers 18a, 18b, based upon the degrees of camshaft rotation as measured by the cam position sensors, and desired degrees of camshaft rotation, and as determined by internal control algorithms. The engine 5 with the variable cam phasing system and the controller 10 are well known to those skilled in the art.

A second embodiment of the engine (not shown) comprises the engine 5 configured with dual banks of in-line cylinders, the dual banks being typically arranged in a V-configuration or opposed configuration as is well known in the automotive arts, and a first and a second intake camshaft (not shown) and a first and a second exhaust camshaft (also not shown) for the respective cylinder banks. The first intake camshaft is operable to open and close each of the intake valves on the first bank of the engine 5, and the second intake camshaft is operable to open and close each of the intake valves on the second bank of the engine 5. The first exhaust camshaft is operable to open and close each of the exhaust valves on the first bank of the engine 5, and the second exhaust camshaft is operable to open and close each of the exhaust valves on the second bank of the engine 5. In this embodiment, the variable cam phasing system preferably comprises a first and a second vane-type variable cam phaser, each of which is operably attached to the first intake camshaft or the second intake camshaft, and each is fluidly connected to a first oil control valve (not shown); and further, a third and a fourth vane-type variable cam phaser, each of which is operably attached to the first exhaust camshaft or the second exhaust camshaft, and each is fluidly connected to a second oil control valve (not shown). The first oil control valve controls the flow of pressurized engine oil to the first and the second vane-type variable cam phasers in unison, and the second oil control valve controls the flow of pressurized engine oil to the third and fourth vane-type variable cam phasers in unison. Each of the camshafts is provided with a respective cam position sensor (not shown) that is operable to measure degrees of camshaft rotation of the respective camshafts, and the cam position sensors are signally electrically connected to the controller 10. The controller 10 is operably connected to the first and second oil control valves and controls the flow of pressurized engine oil to the first and the second vane-type variable cam phasers and to the third and fourth vane—type variable cam phasers, respectively, based upon the degrees of camshaft rotation and desired degrees of camshaft rotation, as determined by internal control algorithms. The variable cam phasing system and the controller 10 for in-line engines and dual-bank engines are well known to those skilled in the art. (For ease of presentation, the following discussion is directed to the single-bank, inline engine 5 shown in FIG. 2. However, it should be recognized that all other engine configurations, and especially engines having more than two phasers, are fully comprehended by the invention.)

The controller 10 is also preferably operably attached to other sensors and output devices to monitor and control engine operation. The output devices preferably include subsystems necessary for proper control and operation of the engine, including a fuel injection system, a spark-ignition system, an electronic throttle control system, an exhaust gas recirculation system, and an evaporative control system (not shown). The sensors include devices operable to monitor engine operation, external conditions, and operator demand, and are electrically attached to the controller 10. The engine sensors preferably comprise the cam position sensors, an exhaust gas oxygen sensor, a crank shaft speed sensor that measures engine speed, a manifold absolute pressure sensor for determining engine load, a throttle position sensor, a mass air flow sensor, and others (not shown). Other sensors preferably include an accelerator pedal position sensor, among others (not shown). The controller 10 controls operation of the engine 5 by collecting input from the sensors and controlling the output devices, using control algorithms and calibrations internal to the controller 10 and the various sensors. The use of the controller to control operation of the internal combustion engine using output devices, based upon input from various sensors and internal algorithms, is well known to those skilled in the art.

The capability of a camshaft phaser system to respond to commanded change increases with increasing engine speed because of higher oil pump pressure, and decreases with increasing engine temperature because of reduced oil viscosity resulting in greater parasitic oil loss through leaks. An important consequence is that the rate at which a phaser can operate (minimum, maximum, and normal) is variable and will depend upon engine speed and oil temperature.

As a camshaft rotates to actuate valves, the sum of the forces acting on the camshaft at any instant is not zero. The camshaft experiences momentary torque reversals as each valve climbs its own lobe eccentric and then descends again. This also results in different phasing rates for advance and retard directions at any given operation point.

Further, as the intake and exhaust cam phasers typically have different (opposite, in fact) default positions and directions of travel (intake fully retarded and exhaust fully advanced), they tend to react differently at any given operating condition. The present invention comprehends this by making available separate rate limit calibration tables for the advance and retard directions for both the intake and exhaust cam phasers.

It is desirable that the intake and exhaust cam phasers act symmetrically, to aid and assist in overall balanced control of air, fuel, spark, and exhaust gas dilution, to achieve overall engine control and performance. Thus, it is important to balance the phasing rates of the cam phasers.

The first step in rate balancing is to balance a particular cam phaser so that at any given point that cam phaser has the same response characteristic in both directions of travel (advance and retard). This is especially helpful for the transient fuel calibration, wherein a calibration engineer must manage the flow of fuel both into and out of a wall-wetting puddle model. This difficult task is made more difficult if the additional degree of freedom afforded by a cam phaser responds in an asymmetrical, unbalanced manner. This variable is eliminated in the present invention by calibrating identically the rate limit values in the look up table for advance and retard, but to the slower of the two data sets generated by the engine spin stand.

The second step in rate balancing is to balance the now-symmetrical cam phasers with the overall speed of the rest of the engine control parameters (air, fuel spark, etc.). A phaser can have a very high response rate that can exceed the response capabilities of the rest of the engine parameters. In regions wherein the phaser's capability exceeds that of the rest of the engine management system (EMS), the calibration values in the rate limit look up tables are reduced to more closely match the response characteristics of the rest of the engine and the EMS. This applies to areas of operation wherein engine speed is sufficient to guarantee surplus oil pressure and thus fluid power to the cam phasers. There is no advantage to a phaser's being too fast here, and in fact it is a disadvantage to the overall controllability of the rest of the EMS.

Conversely, at lower engine speeds, wherein oil pump output begins to fall off, and/or at higher oil temperatures wherein parasitic leakage of the hydraulic system both internal and external begins to become a dominant factor, the cam phasing subsystem may be unable to match the rest of the EMS for transient response.

In the prior art, the EMS first moves one phaser and then the other, in a sequential, incremental stepwise manner. The present invention differs by following a protocol that first asks which phaser should take priority of movement. That phaser is then moved at a rate determined from lookup tables to be compatible with the engine oiling capabilities at the moment. The other phaser is also moved if called upon to do so but at a different, and generally lower, rate to avoid exceeding the engine oiling capabilities. By applying a lower, more restrictive rate limit to the lower priority cam phaser, the system ensures an appropriate rate of phaser response for the more important camshaft. For example, under conditions of high oil temperature and low engine speed, the intake phaser receives the higher priority to maintain vehicle driveability and performance, and the exhaust phaser is moved slowly if at all.

In the following discussion and method, the term "phaser error" is defined as the angular difference between the actual instantaneous rotational position of the phaser and the desired rotational position of the phaser at the time of interrogation of the system. The controller then acts to move the phaser at a rate specified in rotational degrees per second to the desired rotational position. The higher priority phaser moves at the highest rate possible, consistent with engine oiling capability. When the initial positional error is high, the lower priority phaser is constrained from any motion at all, to permit the higher priority phaser to move as rapidly as possible in order to meet engine operating goals as rapidly as possible. As the higher priority phaser nears its optimal position (low phaser error), the lower priority phaser is allowed to begin moving, albeit at a relatively low rate.

FIGS. 1-8 are illustrative of the method of the invention.

Figure 1B:
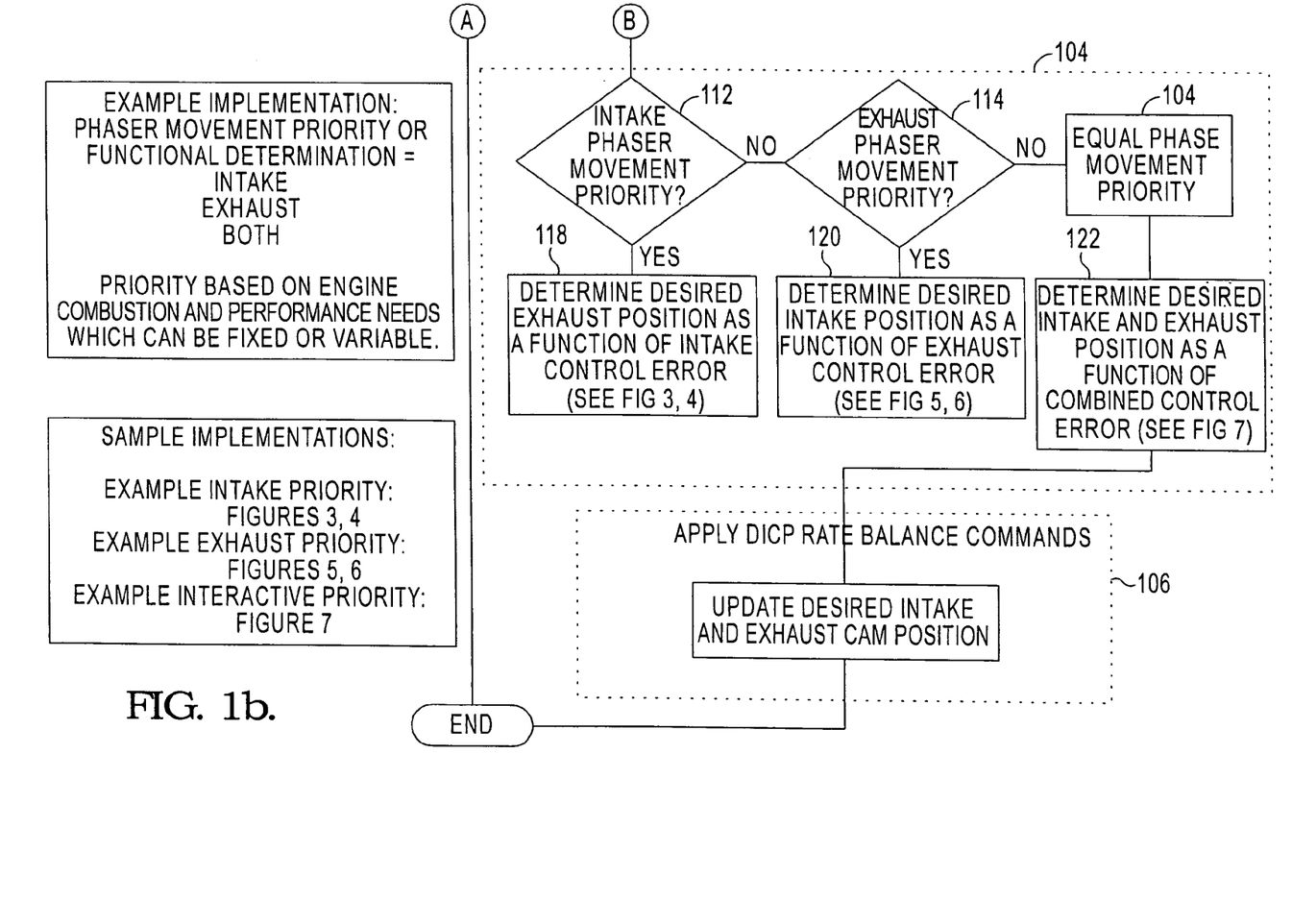

Referring to FIGS. 1a-1b, a method 100 for controlling dual independent camshaft phasers in accordance with the invention has three basic steps: a) first, determining if rate balancing between the two phasers is required 102; b) second, determining the optimal rate balancing commands 104; and c) third, applying the determined rate balancing commands 106 to the appropriate phaser(s).

In first determination 102, the need for rate balancing is assessed by evaluating the engine speed, engine oil or coolant temperature, and the intake/exhaust phaser error. In an example 102a of a determination 102, engine speed is below a lower calibration limit and oil temperature is above an upper calibration limit, the two factors combining to limit the oiling capacity of the engine. Further, the phaser command error for either the intake phaser or the exhaust phaser exceeds phaser calibration error. Thus the answer to decision point 108 (DICP fluid power demand exceeds engine oiling system fluid power capacity) is Yes 110, indicating that when phaser motion is required, a phaser action priority protocol will be invoked which determines the optimal rate balancing commands 104 in accordance with the invention.

Figure 4:
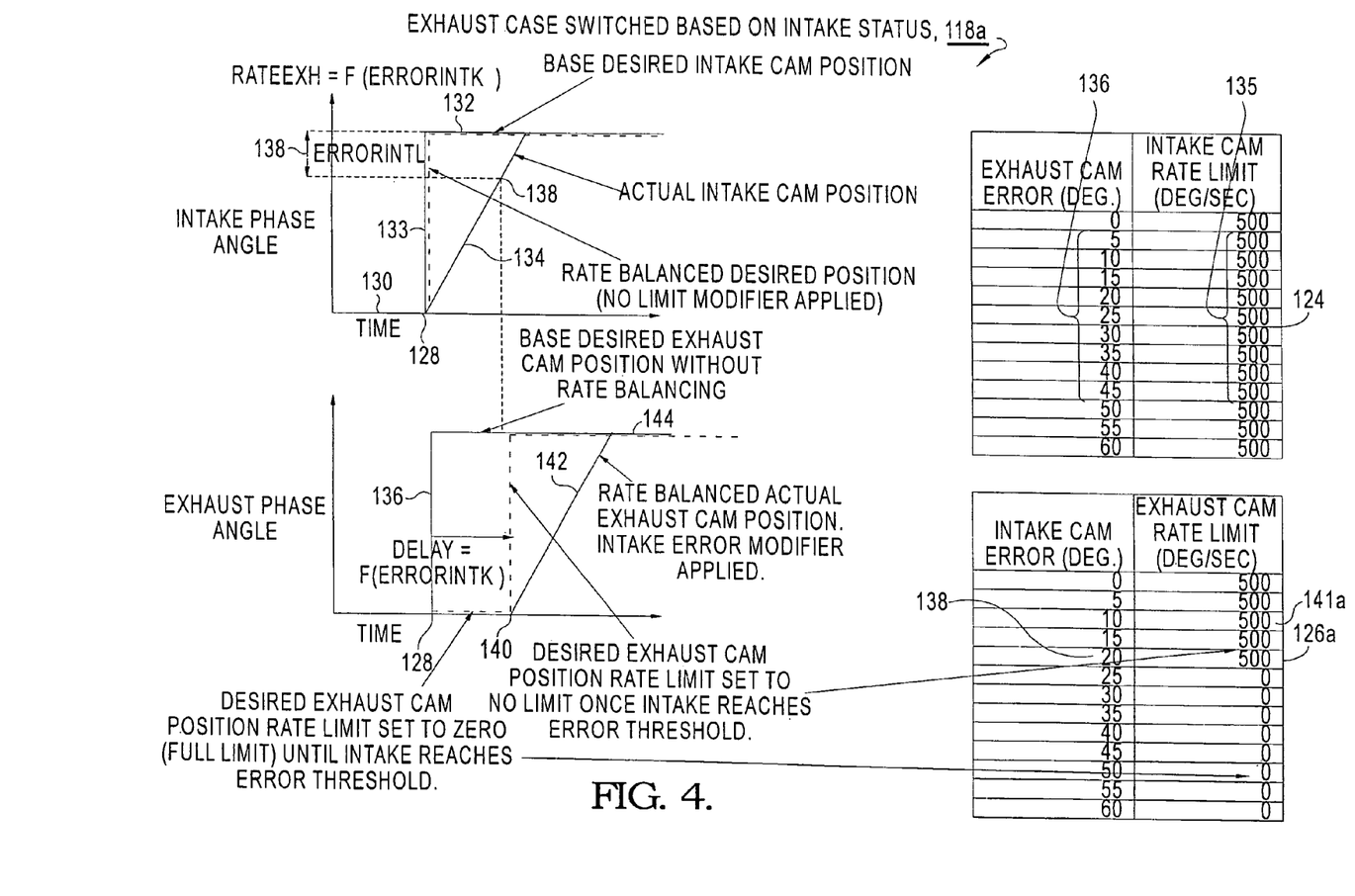
FIGS. 4 and 5 provide graphs showing timing details for the intake and exhaust phasers when the intake phaser has priority of movement.
Figure 5:
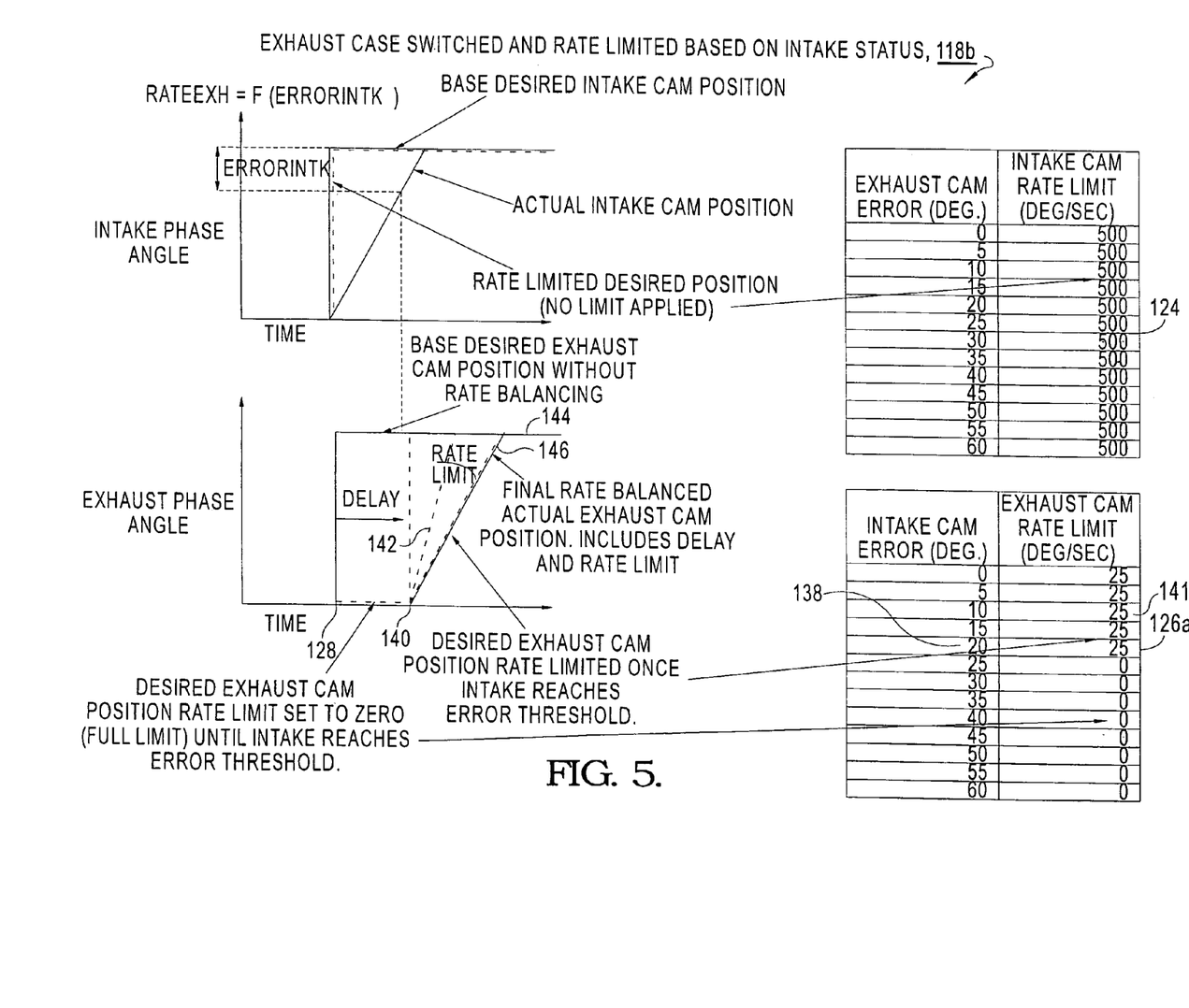
Figure 6:
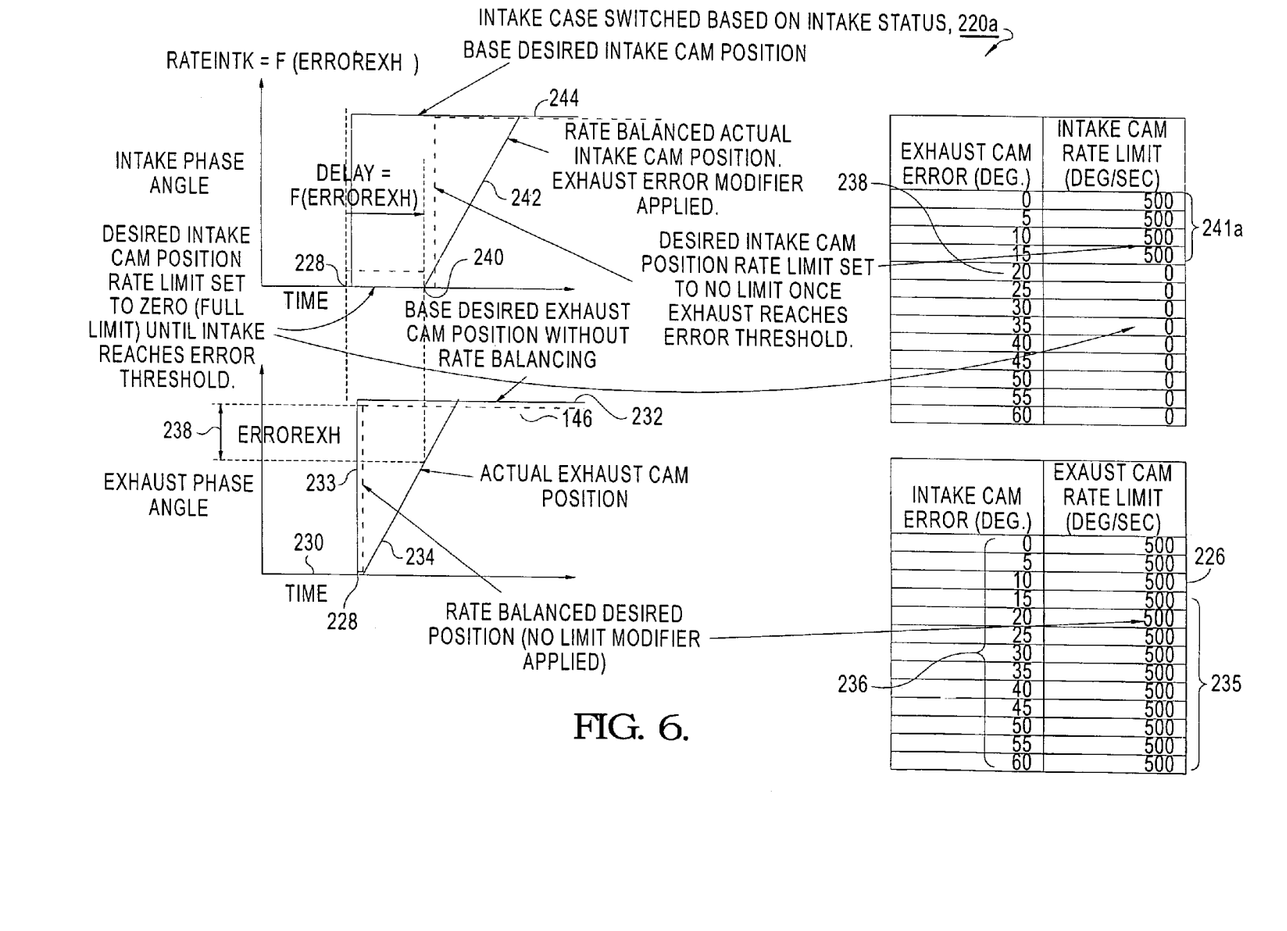
FIGS. 6 and 7 provide graphs showing timing details for the intake and exhaust phasers when the exhaust phaser has priority of movement.
Figure 7:
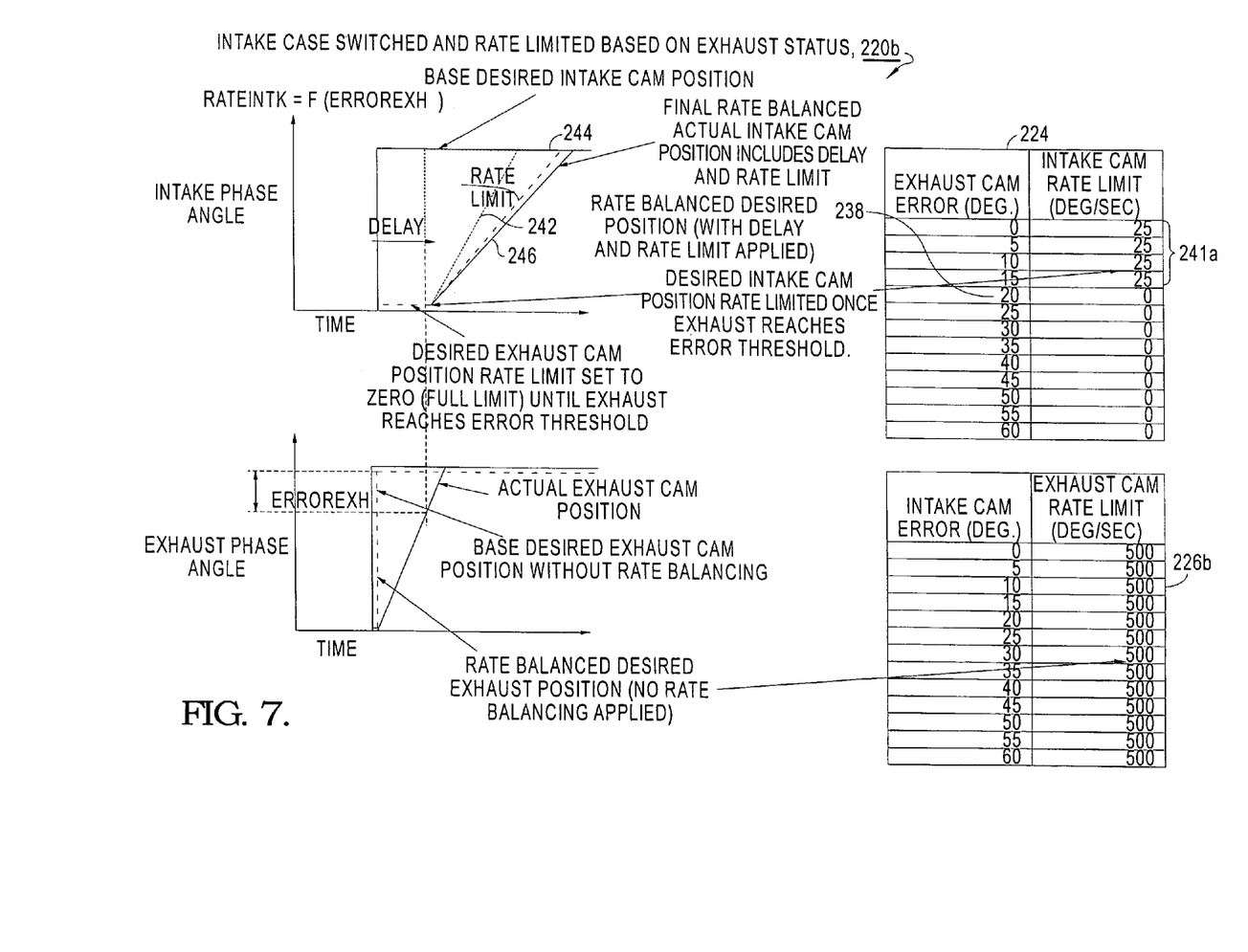
Figure 8:
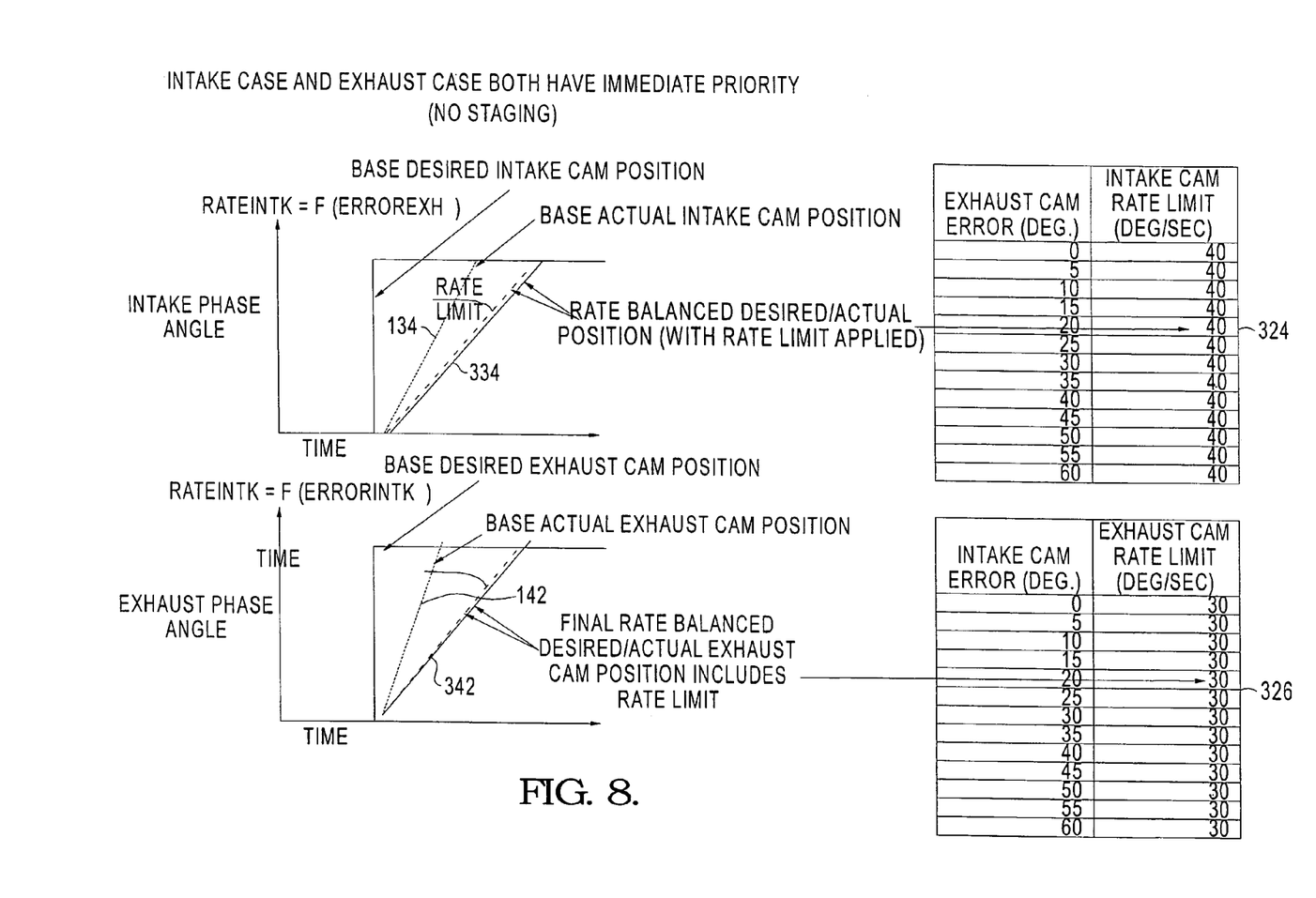
FIG. 8 provides graphs showing timing details for the intake and exhaust phasers when neither phaser has priority of movement.

In second determination 104 (FIGS. 1a-1b and 3a-3b), there are three possible phaser options to select from: the intake phaser requires priority 112; the exhaust phaser requires priority 114; or neither phaser requires priority 116. In case 112, the desired exhaust phaser phase rate 118 is determined as a function of the intake phaser control position error (FIGS. 4 and 5). In case 114, the desired intake phaser phase rate 120 is determined as a function of the exhaust phaser control position error (FIGS. 6 and 7). In case 116, the desired intake phaser phase rate and the desired exhaust phaser phase rate 122 are both determined as a function of the combined intake and exhaust phaser control position errors (FIG. 8). The rate balancing command is scheduled as a function of engine requirements stored in algorithms in controller 10 and may include evaluating the optimization of fluid power management (oiling capability), engine emissions, and fuel economy.

Lookup tables predetermined experimentally in known fashion by engine testing are stored in controller 10. The three main options 118, 120, 122 for command determination are shown in more detail in FIGS. 3a-3b wherein calibration lookup tables are provided to give an example of an implementation in each option. The lookup tables for each option are Table A (124): Intake Phaser Rate limit as a function of Exhaust Phaser Error, and Table B (126): Exhaust Phaser Rate limit as a function of Intake Phaser Error 126.

Figure 3A:
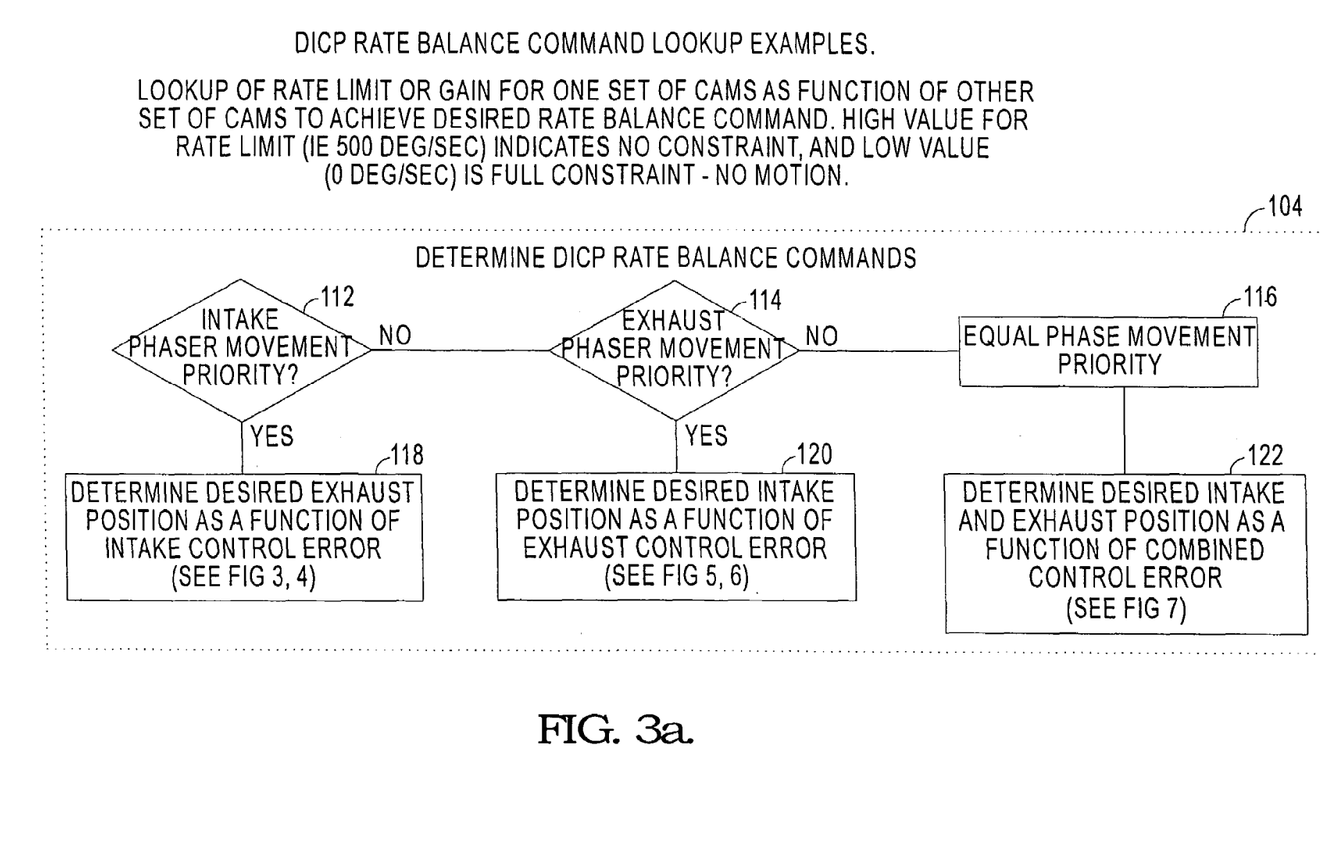
FIGS. 3a-3b provide exemplary lookup tables for the process step of determining DICP rate balance commands.
Figure 3B:
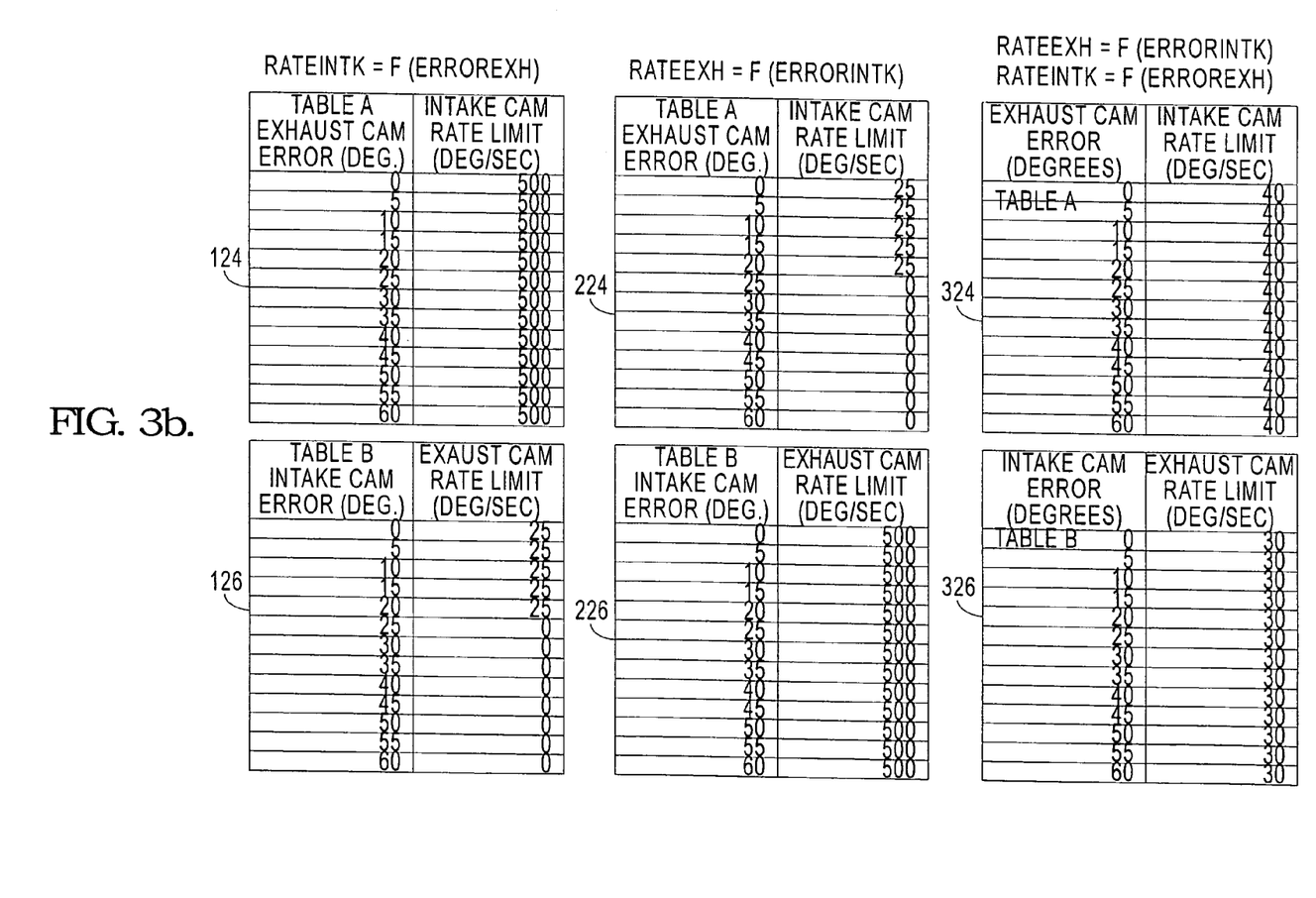

In first option 118 in FIGS. 3a-3b wherein the intake phaser has movement priority, the calibration tables are implemented without rate limit on the intake cam phaser (Table A, intake phase rate limit is set to 500 degrees/sec) while at the same time in Table B the exhaust cam phaser rate limit is set to zero for high values of intake cam phaser error. This calibration results in no movement of the exhaust cam phaser at high intake cam phaser error. Once the intake cam phaser error is low enough (around 20 degrees), which occurs during movement of the intake phaser toward its desired position at its maximum rate, the exhaust cam phaser is allowed to move but at a reduced rate (25 degrees/sec).

Referring to FIG. 5, in a first example 118a of first option 118, the intake phaser has priority and thus moves first (124), beginning at time=0 (128), from an instantaneous position 130 toward a desired position 132 (intake error 133) at a rotational rate of 500 degrees/sec (135) along line 134, without regard to the exhaust phase angle error 136. When the intake cam error 134 has been reduced to a threshold limit of 20 degrees (138) by time=1 (140) (a delay time period defined as the difference between time=1 and time=0), the exhaust cam is also allowed to move, in case 118a without restriction in speed, at 500 degrees/sec (141a) along line 142 until the desired exhaust cam position 144 is reached.

Referring to FIG. 4, a second example 118b of first option 118 is identical with first example 118a (intake cam phaser is controlled identically) except that the engine oiling capabilities are lower, such that the actuation rate of the exhaust cam phaser must be limited to no more than 25 degrees/sec (141b). Thus, the position of the exhaust cam phaser moves along lower-slope line 146, rather than unrestricted line 142 as in example 118a.

In second option 120 (FIGS. 3a-3b) wherein the exhaust phaser has movement priority, the calibration tables are implemented without rate limit on the exhaust cam phaser (Table B 226, exhaust phase rate limit is set to 500 degrees/sec) while at the same time in Table A 224 the intake cam phaser rate limit is set to zero for high values of exhaust cam phaser error. This calibration results in no movement of the intake cam phaser at high exhaust cam phaser error. Once the exhaust cam phaser error is low enough (around 20 degrees), which occurs during movement of the exhaust phaser toward its desired position at its maximum rate, the intake cam phaser is allowed to move but at a reduced rate (25 degrees/sec).

Referring to FIG. 6, in a first example 220a of second option 120, the exhaust phaser has priority and thus moves first, beginning at time=0 (228), from an instantaneous position 230 toward a desired position 232 (intake error 233) at a rotational rate of 500 degrees/sec (235) along line 234, without regard to the intake phase angle error 236. When the exhaust cam error 234 has been reduced to a threshold limit of 20 degrees (238) by time=1 (240), the intake cam is also allowed to move, in case 220a without restriction in speed, at 500 degrees/sec (241a) along line 242 until the desired intake cam position 244 is reached.

Referring to FIG. 7, a second example 220b of second option 120 is identical with first example 220a (exhaust cam phaser is controlled identically) except that the engine oiling capabilities are lower, such that the actuation rate of the intake cam phaser must be limited to no more than 25 degrees/sec (241b). Thus, the position of the intake cam phaser moves along lower-slope line 246, rather than unrestricted line 242 as in case 220a.

In third option 122 (FIGS. 3a-3b and 8) wherein neither the intake phaser nor the exhaust phaser has movement priority (i.e., both have immediate priority), the calibration tables 324,326 are implemented to rate limit both intake and exhaust phasers to a level which minimizes fluid power demands while providing desired control performance (Table A 324: intake phase rate limit is set to 40 degrees/sec; and Table B 326: exhaust phase rate limit is set to 30 degrees/sec). This calibration results in a reduced response rate 334 for the intake phaser and a reduced response rate 342 for the exhaust phaser, which rates are reduced with respect to their respective unmodulated rates 134, 142.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In an internal combustion engine having at least one intake cam phaser and at least one exhaust cam phaser, each phaser being controllable independently at a controlled phase rate by an engine controller,
   a method for controllably balancing simultaneously the independent actuations of said intake cam phaser and said exhaust cam phaser, comprising the steps of:
   a) selecting a phaser priority from the group consisting of "intake cam phaser has priority of actuation and exhaust cam phaser has non-priority of actuation", "exhaust cam phaser has priority of actuation and intake cam phaser has non-priority of actuation", and "intake and exhaust cam phasers have equal priorities of actuation";
   b) actuating a first cam phaser from said selected priority at a first phase rate;
   c) determining a delay time from the beginning of said actuating of said first cam phaser; and
   d) actuating a second cam phaser from said selected priority at a second phase rate at the end of said delay time.

2. A method in accordance with claim 1 wherein said engine has a determined engine oiling capability and wherein the oiling capability required by said first phase rate and said second phase rate together is less than said determined engine oiling capability.

3. A method in accordance with claim 1 wherein said first phase rate is greater than said second phase rate.

4. A method in accordance with claim 3 wherein said cam phaser having said first phase rate is said intake cam phaser and said cam phaser having said second phase rate is an exhaust cam phaser.

5. A method in accordance with claim 3 wherein said cam phaser having said first phase rate is said exhaust cam phaser and said phaser having said second phase rate is said intake cam phaser.

6. A method in accordance with claim 1 wherein said first phase rate is equal to said second phase rate.

7. A method in accordance with claim 1 wherein at least one of said first and second phase rates is less than a maximum capability phase rate of said respective cam phaser.

8. A method in accordance with claim 1 comprising the prior step of determining whether said selecting step is necessary, based upon engine operating conditions.

9. A method in accordance with claim 8 wherein said engine operating conditions include engine speed and oil temperature.

10. A method in accordance with claim 1 wherein said engine includes a plurality of intake cam phasers.

11. A method in accordance with claim 10 wherein said plurality of intake cam phasers are jointly controlled in unison by said controller.

12. A method in accordance with claim 10 wherein said engine includes a plurality of exhaust cam phasers.

13. A method in accordance with claim 12 wherein said plurality of exhaust cam phasers are jointly controlled in unison by said controller.

14. A method in accordance with claim 1 wherein said first phase rate and said second phase rate are determined with the aid of lookup tables in said engine controller.

15. A method in accordance with claim 1 comprising the prior step of balancing at least one of said first and second phasers such that the rate limit values in a look up calibration table for said phasers for advance and retard directions are identical.

16. A method in accordance with claim 15 wherein said rate limit values in said lookup calibration are the slower of two known predetermined data sets for advance and retard directions generated by an engine spin stand.

17. An internal combustion engine comprising at least one intake cam phaser and at least one exhaust cam phaser, each phaser being controllable independently at a controlled phase rate by an engine controller, wherein said engine controller is programmed to control simultaneously said at least one intake cam phaser and said at least one exhaust cam phaser simultaneously by a method including the steps of selecting a phaser priority from the group consisting of "intake cam phaser has priority of actuation and exhaust cam phaser has non-priority of actuation", "exhaust cam phaser has priority of actuation and intake cam phaser has non-priority of actuation", and "intake and exhaust cam phasers have equal priorities of actuation", actuating a first cam phaser from said selected priority at a first phase rate, determining a delay time from the beginning of said actuating of said first cam phaser, and actuating a second cam phaser from said selected priority at a second phase rate at the end of said delay time.

18. An engine in accordance with claim 17 wherein said engine is selected from the group consisting of inline and dual bank.

\* \* \* \* \*